Sept. 13, 1927.

W. L. SCRIBNER 1,642,513

DIFFERENTIATING MINE CAR AXLE

Filed Dec. 21, 1925

2 Sheets-Sheet 1

Inventor
W. L. Scribner
By Frease and Bond
Attorneys

Sept. 13, 1927.

W. L. SCRIBNER 1,642,513

DIFFERENTIATING MINE CAR AXLE

Filed Dec. 21, 1925

2 Sheets-Sheet 2

Inventor
W. L. Scribner
By Frease and Bond
Attorney

Patented Sept. 13, 1927.

1,642,513

UNITED STATES PATENT OFFICE.

WILLIAM L. SCRIBNER, OF CANTON, OHIO, ASSIGNOR TO THE TIMKEN ROLLER BEARING COMPANY, OF CANTON, OHIO, A CORPORATION OF OHIO.

DIFFERENTIATING MINE-CAR AXLE.

Application filed December 21, 1925. Serial No. 76,622.

The invention relates to roller bearing axles, especially adapted for use upon mine cars and the like, and more particularly to a differentiating axle which permits the wheels to travel at different speeds, as when passing around a curve.

It is common practice in the construction of mine cars and the like to fix a wheel upon each end portion of an axle but such an arrangement does not permit of a differential speed in the travel of the wheels as the car passes around a curve, causing one wheel or the other to skid or slide upon the track.

To overcome this objection, cars of this type have been constructed in which each wheel is rotatably mounted upon the axle but such a construction requires the use of two roller bearings for each wheel and requires the removal of the bearings with the wheels, increasing the cost of the car and complicating the construction thereof.

The object of the present improvement is to provide a differentiating axle in which only one roller bearing is required for each wheel, the axle being formed in two aligned sections independently rotatable, the wheels being fixed to these sections of the axle and provided each with a single roller bearing journaled within the axle housing.

Figure 1:
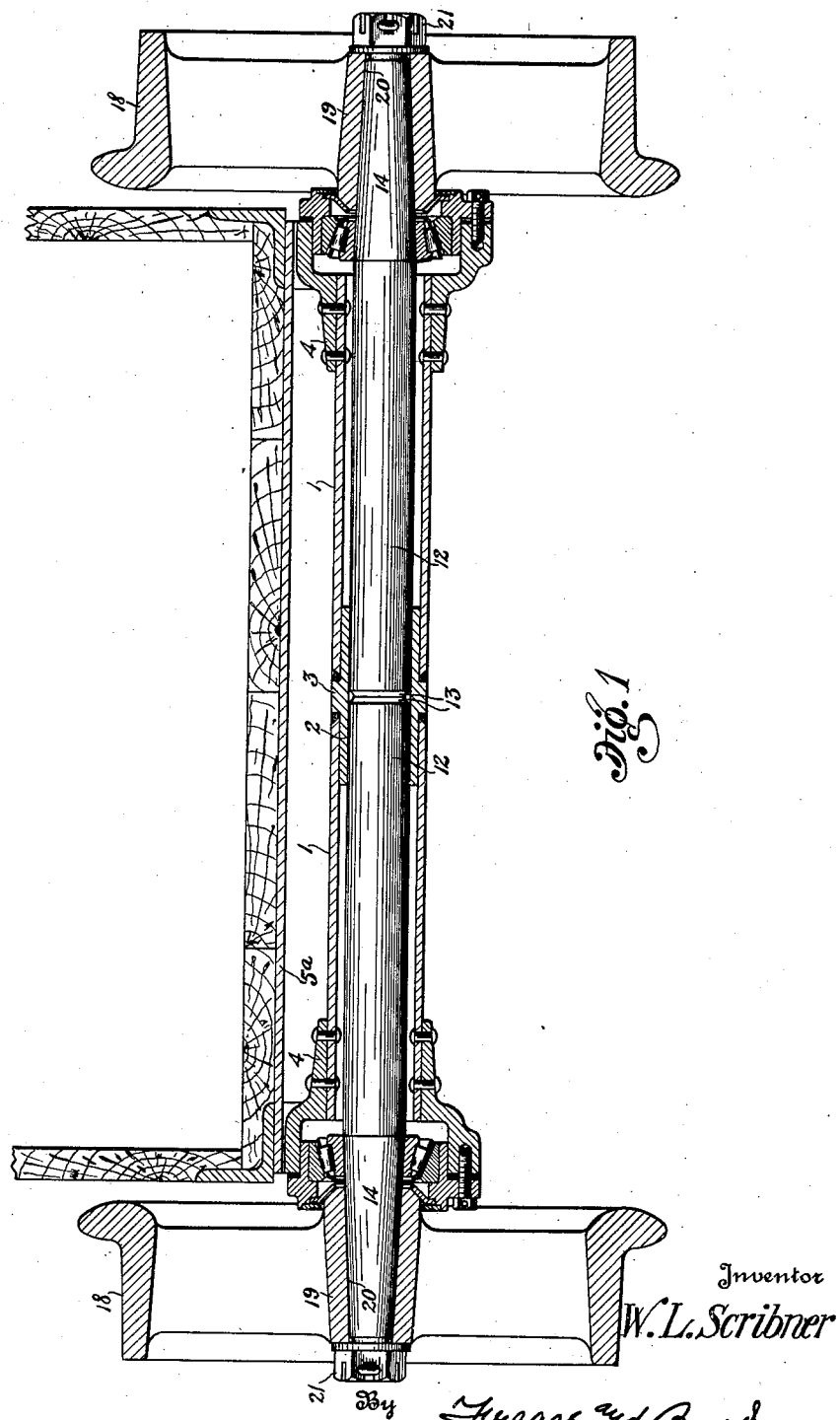
Figure 2:
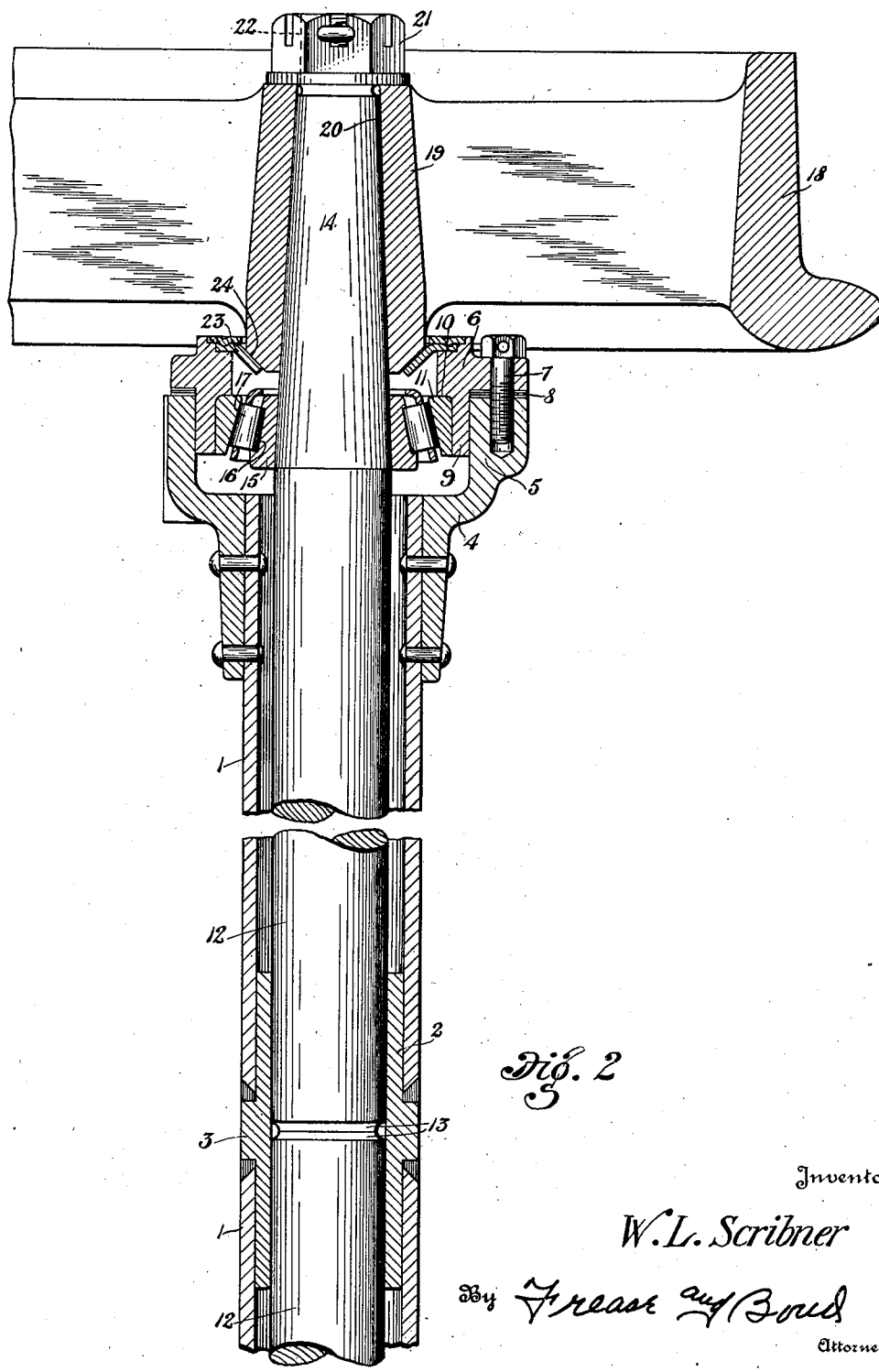

An embodiment of the invention is illustrated in the accompanying drawings, in which Figure 1 is a longitudinal, sectional view of an axle constructed in accordance with the invention, and Fig. 2, an enlarged sectional view of one half or section of the axle showing the wheel carried thereby.

Similar numerals refer to corresponding parts throughout the drawings.

The axle housing comprises two tubular sections 1, the adjacent ends of which receive a bearing sleeve 2, having a peripheral central flange 3, to which the ends of the tubular members 1 are connected as by welding.

A collar 4, provided with a cup flange 5 is welded or riveted to each outer end of the axle housing, and connected in any suitable manner to the bottom or floor plate 5ᵃ of the car.

A ring 6 is connected to the end of each cup flange as by screws 7, shim plates 8 being provided to properly space the same. This ring is provided with an annular flange 9 snugly fitting within the cup flange 5 and shouldered as at 10 to receive the cup 11 of a taper roller bearing.

The axle is formed of two aligned independently rotatable sections 12, the inner ends thereof, as shown at 13, being hardened and ground, and journaled within the bearing sleeve 2. The outer end portion of each section or half of the axle is tapered as at 14 and carries the bearing cone 15 fixed thereto as by wedging upon the tapered portion of the axle. This bearing cone may be grooved as at 16 to accommodate the taper bearings 17 which are received within the bearing cup 11.

The wheel 18 is provided with a hub 19 having the coned central opening 20 wedged upon the tapered portion 14 of the axle and held substantially thereon as by the nut 21 engaged upon the threaded extremity 22 of the axle.

The interior of the axle housing is preferably filled with grease and to prevent the same from leaking around the wheel hub, a washer 23 of leather or the like may be connected to the ring 6 in any suitable manner and arranged to contact with the tapered inner end 24 of the wheel hub.

Each wheel is thus fixed upon one independently rotatable section of the axle, the sections of the axle being journaled, by means of the taper roller bearings, within the axle housing.

Thus a differentiating axle is provided in which only one roller bearing is required for each wheel the entire thrust and radial load being taken by the roller bearings, requiring no thrust washers or the like.

This enclosed axle construction affords a large grease reservoir permitting the same to be run for a considerable length of time without renewing the grease supply; and as there is no wear on the axle the same may be made of low carbon steel, thereby reducing the cost of the structure.

I claim:

1. A differentiating axle including a tubular axle housing, a central journal bearing therein, a pair of aligned axle sections within the housing having their inner ends abutting and journaled in said journal bearing, the outer end portion of each axle section being tapered, a roller bearing cone upon each tapered portion, a roller bearing cup mounted in each end portion of the housing, taper rollers between each co-operating cone and cup, and a wheel wedged upon the tapered end of each axle section.

2. A differentiating axle including a tubular axle housing, a central journal bearing therein, a pair of aligned axle sections within the housing having their inner ends abutting and journaled in said journal bearing, the outer end portion of each axle section being tapered, a roller bearing cone upon each tapered portion, a roller bearing cup mounted in each end portion of the housing, taper rollers between each co-operating cone and cup, a wheel wedged upon the tapered end of each axle section, and a flexible washer at each end of the housing engaging the hub of the adjacent wheel.

In testimony that I claim the above, I have hereunto subscribed my name.

WILLIAM L. SCRIBNER.